(12) United States Patent
Haubrich et al.

(10) Patent No.: US 8,596,722 B2
(45) Date of Patent: Dec. 3, 2013

(54) ARMREST AND OPERATOR WORKPLACE HAVING SUCH AN ARMREST

(75) Inventors: Thomas Haubrich, Goedenroth (DE); Thomas Klein, Wehr (DE)

(73) Assignee: BOMAG GmbH, Boppard (DE)

( * ) Notice: Subject to any disclaimer, the term of this patent is extended or adjusted under 35 U.S.C. 154(b) by 100 days.

(21) Appl. No.: 13/076,942

(22) Filed: Mar. 31, 2011

(65) Prior Publication Data
US 2011/0248541 A1  Oct. 13, 2011

(30) Foreign Application Priority Data

Apr. 9, 2010  (DE) .......................... 10 2010 014 348

(51) Int. Cl.
*B60N 2/46*  (2006.01)

(52) U.S. Cl.
USPC ................................. 297/411.37; 297/411.35

(58) Field of Classification Search
USPC ............. 297/411.35, 411.37, 188.14, 188.17; 248/118, 118.1, 118.5, 298.1; 180/334
See application file for complete search history.

(56) References Cited

U.S. PATENT DOCUMENTS

| | | | | |
|---|---|---|---|---|
| 5,571,274 A * | 11/1996 | Holstensson | ............ | 297/411.38 |
| 5,746,480 A * | 5/1998 | Bonutti | ................ | 297/411.35 |
| 6,017,091 A * | 1/2000 | Cao | .......................... | 297/411.37 |
| 6,799,803 B1 * | 10/2004 | Lee et al. | ................. | 297/411.35 |
| 7,387,341 B1 * | 6/2008 | Tsai | .......................... | 297/411.35 |
| 2006/0042857 A1 * | 3/2006 | Catton et al. | .................. | 180/334 |

FOREIGN PATENT DOCUMENTS

| | | |
|---|---|---|
| DE | 31 03 161 A1 | 12/1981 |
| DE | 295 19 794 U1 | 4/1997 |
| DE | 10 2004 052 757 A1 | 5/2006 |
| DE | 10 2006 043 988 A1 | 3/2008 |

* cited by examiner

*Primary Examiner* — David Dunn
*Assistant Examiner* — Thomas J Brindley
(74) *Attorney, Agent, or Firm* — Wood, Herron & Evans, LLP

(57) ABSTRACT

The present invention relates to a machine operator seat of a construction machine having a seat surface, a backrest, which is situated opposite to the front seat edge in the longitudinal direction of the seat surface, and at least one armrest situated laterally to the seat surface, comprising a base part, an arm support, and at least one operating element, the arm support being situated in the rear area in the longitudinal direction and the at least one operating element being situated in the front area of the armrest in the longitudinal direction. Furthermore, the present invention relates to a construction machine, in particular a road miller, recycler, stabilizer, or a road roller, in particular a tandem roller, having such a machine operator seat.

14 Claims, 8 Drawing Sheets

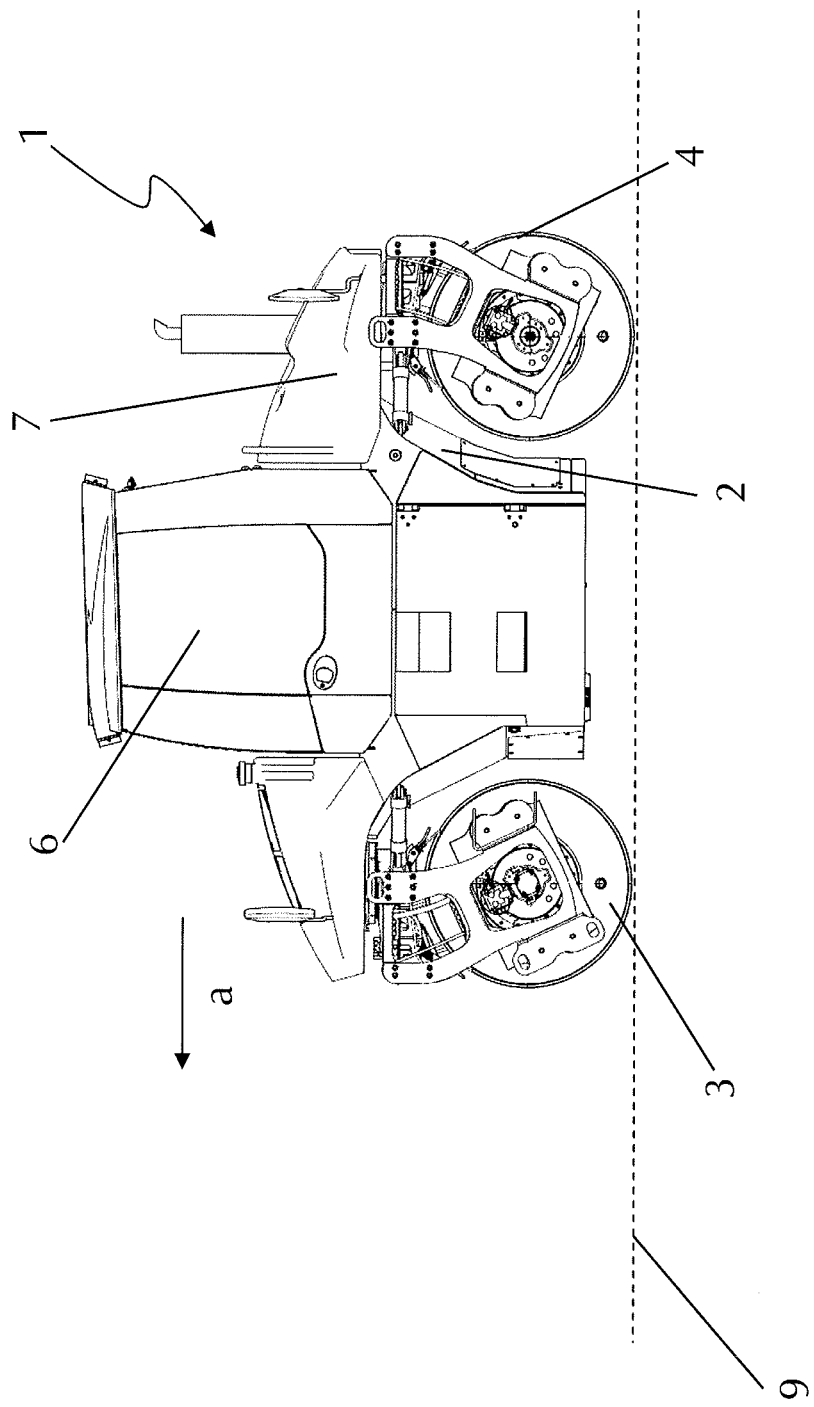

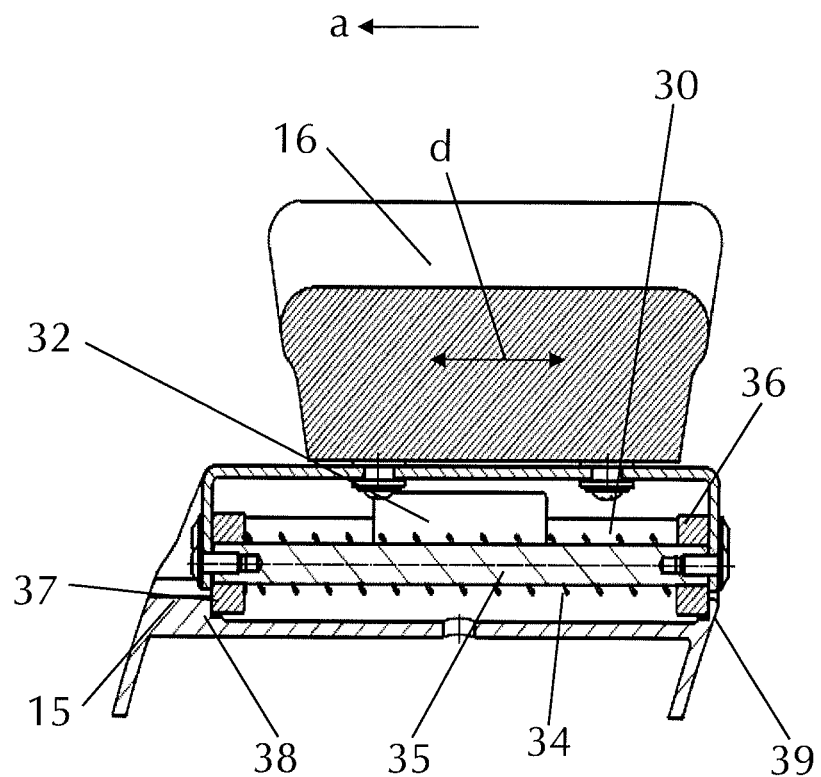
Fig. 5c
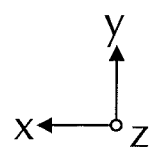

ARMREST AND OPERATOR WORKPLACE HAVING SUCH AN ARMREST

FIELD OF THE INVENTION

The invention relates to a machine operator seat having a seat surface, a backrest situated opposite to the seat surface and the front edge of the seat surface in the longitudinal direction, and at least one armrest situated laterally to the seat surface.

BACKGROUND OF THE INVENTION

The longitudinal direction of the seat surface is established by the forward-oriented viewing direction of an operator seated in the machine operator seat. The front seat edge is the area of the seat in which the legs are angled. On at least one side of the seat surface, the machine operator seat has an armrest situated laterally to the seat surface, comprising a base part, an arm support, and at least one operating element. The base part thus forms the mount for the arm support and the at least one operating element. The arm support is used so that the machine operator can rest his arm thereon for relief in the seated position. The at least one operating element is, for example, a multifunction operating element, in particular having a joystick controller, via which various machine functions such as forward travel and reverse travel can be controlled. The arm support and the at least one operating element are situated on top of the base part, the arm support being situated in the rear area or the area of the base part closer to the backrest in the longitudinal direction, and the at least one operating element being situated in the front area of the armrest in the longitudinal direction or approximately at the height of the front seat edge of the seat surface. In relation to the longitudinal direction, the arm support and the at least one operating element are therefore attached one behind another on the base part.

The arm support is typically fastened fixedly or rigidly on the base part and the armrest can at most be adjusted and fixed as a complete unit in relation to the seat, if at all. To operate the at least one operating element, the arm of the machine operator resting on the arm support therefore typically always moves relative to the arm support, in particular in the case of operating movements oriented forward and backward. In the case of such movements, the driver must either always relieve his arm resting on the arm support, which is strenuous in particular in the case of long-lasting work processes and is perceived as annoying. Alternatively, the machine controller can slide his arm back-and-forth in relation to the arm support, the friction phenomena which occur also being perceived as extremely annoying and, for example, possibly resulting in soreness of the corresponding skin areas.

The object of the invention therefore comprises specifying a machine operator seat and a construction machine having such a machine operator seat, in which the above problems no longer occur, in order to allow higher operating comfort of the machine operator in this way.

SUMMARY OF THE INVENTION

To achieve this object, it is provided according to the present invention that the machine operator seat has an arm support, which is mounted via a guide device on the base part of the armrest, the guide device being implemented in such a way that the arm support is freely displaceable in relation to the base part in a limited longitudinal displacement range along the longitudinal direction of the armrest. An essential aspect of the present invention is therefore primarily that the arm support is not mounted rigidly on the base part of the armrest, as heretofore typical, but rather a guide device is provided for connecting the arm support to the base part, which allows a mobility of the arm support in relation to the rigid base part. The mobility of the arm support is not unlimited, but rather is allowed by the guide device in a defined and limited longitudinal displacement range. In other words, the arm support is therefore movable along the base part in the longitudinal direction or viewing direction of the operator seated in the machine operator seat. It is provided according to the invention that the arm support, to increase the comfort, is not fixedly fixed solely by corresponding setting options, but rather is freely or non-fixedly displaceable. If the operator seated in the machine operator seat therefore presses the at least one operating element forward, the arm resting on the arm support, specifically the forearm, can follow this movement, in that the arm support is displaced jointly with the arm on the base part forward toward the at least one operating element. This is also true conversely for a reverse movement of the at least one operating element, for example. The arm support can therefore follow the movement of the arm of the operator. In particular the forearm of the operator must therefore no longer slide back-and-forth on the arm support, but rather can complete the operating movements together with the arm of the operator resting on the arm support. It is therefore possible for the operator to support his arm continuously and over the entire operating procedure on the arm support, which results in substantial relief of the operator. In addition, the optimum relative positioning between the arm, the at least one operating element, in particular a driving lever handle or a joystick controller, and the arm support can always be maintained, which finally allows a substantial increase of the precision of the machine control.

The guide device preferably comprises a linear guide. A linear guide is distinguished in that it ensures guiding in one spatial axis, preferably along the forward viewing direction of the operator or the longitudinal direction of the seat surface. It is thus ensured that the arm support moves on a controlled displacement path relative to the base part. When the longitudinal direction is referred to hereafter without further specification, the longitudinal direction relates to the direction of an operator seated directly forward and in the machine operator seat. The longitudinal direction therefore runs over the seat surface coming from the backrest toward the front seat edge.

The guide device is preferably implemented as self-positioning in such a way that the arm support automatically moves in the unloaded state into a defined starting position with respect to its positioning in the longitudinal direction of the armrest. This embodiment is distinguished in that the arm support always returns into the same starting position from various displaced positions relative to the base part of the armrest upon relief, for example, by raising the arm when exiting the machine. For the operator, it is therefore ensured that the arm support is always located in the same starting position, for example, when the construction machine is put into operation. Such an embodiment is also particularly safe, since it is ensured that emergency devices, such as an emergency stop button, are easily accessible in a hazardous situation and are not concealed by the displaced arm support on the base part, for example. By simply raising the arm, the arm support springs back into its starting position and the operator seated in the machine operator seat can reliably reach the corresponding emergency device.

The concrete implementation of the self-positioning function of the guide device can be implemented by various design measures. Thus, for example, pneumatic or motorized variants are possible, in particular in combination with a suitable linear guide. However, mechanical solutions are preferred, in particular in the form of suitable spring loading, since they are distinguished by high reliability, for example.

Fundamentally, the starting position can be selected in such a way that the arm support, starting from its starting position, can be displaced exclusively forward or exclusively backward in relation to the base part. Ideally, however, the guide device is implemented in such a way that the arm support is displaceable freely forward and backward in a limited range in relation to the starting position in the longitudinal direction of the armrest. The starting position is therefore selected rather centrally in relation to the limited longitudinal displacement range, in order to allow the operator a movement of the arm together with the arm support relative to the base part, which is directed both forward and also backward, starting from the starting position.

Situations frequently occur in which the operator seated in the machine operator seat turns to the side in relation to the longitudinal direction in the machine operator seat, in particular to be able to better observe the lateral area of the construction machine, for example, during work close to the edge, in particular rolling or milling. If he turns toward the side of the armrest, the arm presses against the arm support away from the seat surface. If he looks in the other direction, the arm on the arm support pulls toward the seat surface. This is also the case, for example, if the operator moves from his seated position to a standing position. In order to also be able to compensate for the lateral movements of the arm resting on the arm support, a further preferred embodiment provides the implementation of the guide device in such a way that the arm support is freely laterally displaceable in a limited lateral displacement range. The guide device therefore allows, in addition to the longitudinal displacement movement oriented in the longitudinal direction, a lateral displacement movement running essentially perpendicularly thereto in the horizontal plane. It is therefore possible to freely move the arm together with the arm support in the area of the limited displacement ranges in the horizontal plane. Furthermore, it is also preferable with respect to the lateral displaceability to provide a self-positioning function in the guide device.

The guide device preferably comprises a sliding carriage, which is mounted so it is displaceable on the base part of the armrest via a friction bearing which is fixed in place in relation to the base part, the arm support being situated on the sliding carriage. The sliding carriage is therefore guided on the friction bearing of the base part of the armrest.

The sliding carriage preferably has an essentially horizontally extending area and a tab which is bent over toward the base part on each of the opposing sides of this area in the longitudinal direction. Between the two tabs, at least one guide rail is situated, which is guided on a friction bearing situated so it is fixed in place on the base part. For the longitudinal displacement of the arm support, the sliding carriage runs together with the sliding carriage along the friction bearing in this embodiment. The essentially horizontally extending area is preferably implemented as one component together with the two bent-over tabs situated opposite to one another. The guide rail can preferably be a tubular rail whose longitudinal axis is oriented in the longitudinal displacement direction.

In order to allow the self-positioning function of the sliding carriage, a spring guide rail, on which a restoring spring is situated, preferably runs between the two tabs. The restoring compression spring is therefore tensioned by compression and exerts a restoring force into its non-compressed position in the compressed state. The spring guide rail is guided through the restoring spring in this embodiment. In this way, it is ensured that the restoring compression spring does not arbitrarily deviate in the event of a compression, but rather is compressed along its longitudinal axis and the restoring force acts along the longitudinal axis of the restoring compression spring.

At least one stop element, which is displaceable along the spring guide rail, is preferably situated on the axial ends of the restoring compression spring, against which the restoring compression spring stops and by which it is compressed upon continued displacement movement toward the restoring compression spring. A stop is provided on the base part for this purpose, against which the stop element stops and thus prevents a continuation of the displacement movement of the stop element in one direction. If the displacement movement of the sliding carriage is continued, the restoring compression spring increasingly presses against the fixed stop element and thus builds up a restoring force.

In order to allow a central positioning of the starting position in relation to the limited longitudinal displacement range, it is preferably provided that a stop element, which is displaceable along the spring guide rail, is situated on each of the two axial ends of the restoring compression spring, and two stops situated spaced apart from one another in the longitudinal direction are provided on the base part in such a way that the restoring function or the compression of the storing compression spring is triggered, starting from the starting position of the arm support, in one displacement direction by the stopping of a stop element against the stop and in the other displacement direction by the stopping of the other stop element against the other stop on the base part.

The guide rail and the spring guide rail of the support carriage can be separate components. In order to reduce the number of the required components of the guide device, however, it can also be provided that the guide rail simultaneously fulfills the function of the spring guide rail. The restoring compression spring therefore has the guide rail running through it along its longitudinal axis in this embodiment.

If a lateral displaceability of the arm support is provided in addition to the longitudinal displaceability of the arm support, the sliding carriage can have at least one oblong hole for guiding the lateral adjustment movement of the arm support in relation to the base part in a further preferred embodiment, in which a guide element situated on the arm support, for example, a guide pin having a guide bush, engages. An oblong hole guide is therefore obtained as a whole using the oblong hole and the guide element, the longitudinal axis of the oblong hole running laterally or orthogonally to the longitudinal direction of the armrest to obtain the lateral mobility.

Fundamentally, in addition to the above-mentioned embodiments having an armrest according to the invention situated laterally on the seat, embodiments are also possible which have such an armrest on each of the two sides.

A further essential aspect of the invention is that the longitudinal displaceability of the arm support relative to the base part and, if provided, also the lateral displaceability is possible to a limited extent in each case. It is thus ensured that the arm support is not pushed out of the guide device in the event of excessive displacement, for example. For this purpose, a displacement limited in the form of a limit stop on the base part is provided, for example, against which the sliding carriage stops upon maximum displacement and is prevented from sliding out of the guide device, for example. For this purpose, for example, a projection oriented toward the support carriage can be provided on the base part, against which one of the tabs stops at maximum displacement. A further possibility to obtain a limit stop can be obtained by the edge area of an oblong hole guide.

A further aspect of the invention is a construction machine, in particular a road miller, in particular a cold miller, a recycler, a stabilizer, or a road roller, especially a tandem roller, having such a machine operator seat.

BRIEF DESCRIPTION OF THE DRAWINGS

The invention is explained in greater detail hereafter on the basis of the exemplary embodiments specified in the figures. In the schematic figures:

FIG. 1 shows the top view of a construction machine, specifically a tandem roller;

FIG. 2b shows a top view of the machine operator seat from FIG. 2a;

FIG. 3b shows a detail enlargement of the armed support and the guide device from FIG. 3a;

FIG. 4b shows a detail enlargement of the arm support and the guide device from FIG. 4a;

FIG. 5b shows a horizontal section through the guide device from FIG. 5a;

FIG. 5c shows a vertical sectional view in the longitudinal direction through the arm support and the guide device in the longitudinal direction;

Identical components are provided with identical reference numerals in the figures. For the sake of clarity, not every repeating component is identified separately in each of the figures.

DETAILED DESCRIPTION OF THE INVENTION

Figure 2A:
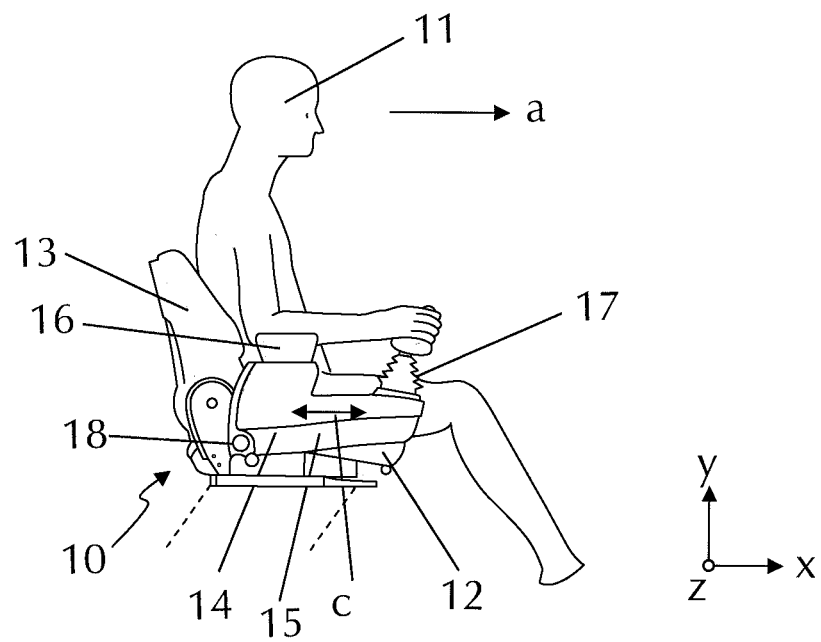
FIG. 2a shows a side view of a machine operator seat having a seated operator.

The side view from FIG. 1 shows a typical construction machine 1, specifically a so-called tandem roller. The essential elements of the construction machine 1 are a machine frame 2, a front roller 3, and a rear roller 4. Furthermore, a drive device 7 is provided, which delivers the drive energy required to drive the construction machine 1. For ground processing, the construction machine 1 is moved in the arrow direction a (forward direction) over the ground 9 to be processed. An operator of the machine is seated in a machine operator seat according to the invention (not visible in FIG. 1) in the cab 6 and controls the machine functions therefrom.

This machine operator seat 10 is shown in FIG. 2a having an operator 11 seated therein, the machine operator seat 10 not being freely floating, of course, but rather being housed via appropriate connections, which are indicated by dashed lines in FIG. 2a, in the cab 6. The essential elements of the machine operator seat 10 are a seat surface 12, a backrest 13, and an armrest 14 situated laterally to the seat surface 12. Laterally therefore relates to the positioning adjacent to the operator 11 seated in the machine operator seat 10, so that he can comfortably use the armrest 14 to rest his arm.

The armrest 14 has, in addition to a lower base part 15, an arm support 16 and a multifunction operating element 17, which are both situated above the base part 15. Furthermore, a clamping screw 18 is provided, which is guided through an oblong hole guide in the base part 15 (not visible in FIG. 2a). By loosening the clamping screw 18, the entire armrest 14 can be adjusted along arrow direction c, in order to allow a fine adjustment adapted to the respective proportions of the operator 11. This adjustment capability solely allows fixing of the armrest in various positions and is provided for adapting the machine operator seat 10 to the proportions of the operator 11. Of course, the machine operator seat 10 is also adjustable in height per se and the angle of the backrest 13 to the seat surface 12 is settable.

Following FIGS. 2b to 6b all relate to the machine operator seat 10 in the embodiment shown in FIG. 2a, for reasons of clarity, the operator 11 no longer being shown in the following figures.

Figure 2B:
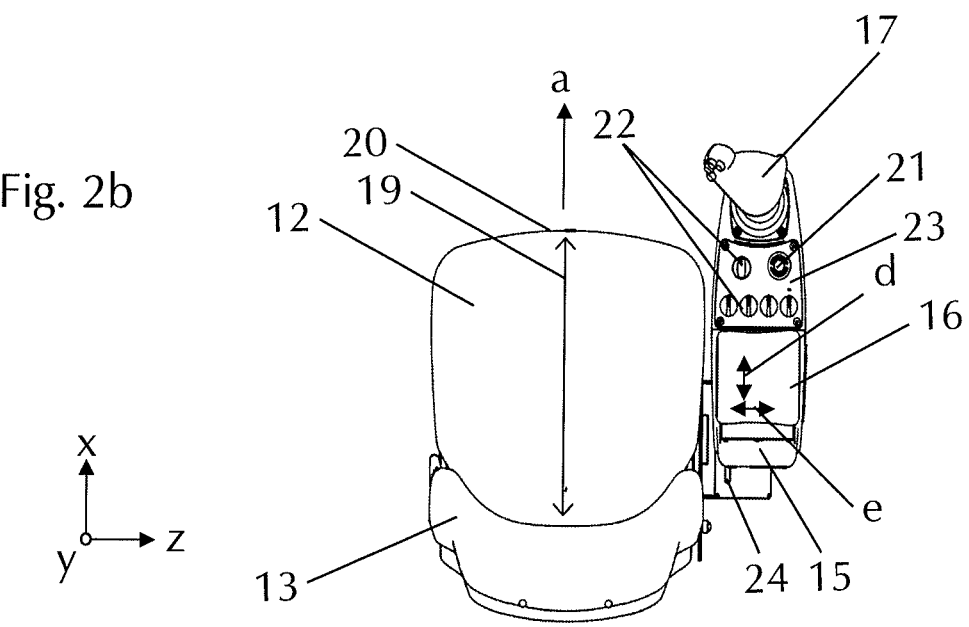

The top view from FIG. 2b first illustrates the location of the longitudinal axis 19 of the seat surface 12, which runs parallel to the forward or viewing direction a. The longitudinal axis 19 of the seat surface 12 therefore extends from the backrest 13 up to the front seat edge 20 of the seat surface 12. Furthermore, it is obvious from FIG. 2b that further operating elements, specifically an emergency stop switch 21 and the operating switches 22, are situated in the base part 15 of the armrest 14 in addition to the multifunction operating element 17. The emergency stop switch 21 and the further operating switches 22 are assembled into an operating panel 23, which is situated in the forward direction a between the arm support 16 and the multifunction operating element 17, which is situated on the front edge of the armrest 14. The switches of the operating panel 23 are accessible from above, so that the operator 11 can easily reach the emergency stop switch 21 in hazardous situations, for example. In FIG. 2b, the armrest 14 is displaced further forward in the arrow direction c in relation to the backrest 13, so that a part of the oblong hole guide 24, in which the armrest 14 is guided in its entirety relative to the seat surface 12, is visible. The fixing of this displacement mechanism is essentially performed via the clamping screw 18 visible in FIG. 2a, which engages in a further longitudinally running guide (not visible in FIG. 2b) running at a right angle to the oblong hole guide 24.

One aspect of the machine operator seat 10 according to the present invention is that the arm support 16 is mounted so it is longitudinally displaceable or displaceable along the longitudinal axis 19 of the seat surface on the base part in relation to the base part 15 of the armrest 14. The displaceability of the arm support 16 is identified by the arrow direction d. In contrast to the adjustability of the entire armrest via the adjustment device actuated using the clamping screw 18, which allows a fixed or rigid setting of the armrest 14 in relation to the seat surface 12, the arm support 16 is mounted so it is freely displaceable in the arrow direction d on the base part 15 of the armrest 14 in a limited range. "Free" is to be understood to mean that no fixing device is provided, which fixes the arm support 16 in relation to the base part 15. In this limited longitudinal displacement range, the arm support 16 is rather always displaceable or "floating", so that the arm support 16 can follow the operating movements of the operator, in particular on the multifunction operating element 17. For example, if the operator 11 presses the multifunction operating element 17 in FIG. 2a forward, it is not necessary to relieve the arm resting on the arm support 16 or slide it along the arm support 16. Rather, because of its free longitudinal displaceability, the arm support 16 is capable of following the operating movement of the operator 11 forward and backward (or in the arrow direction a and opposite to the arrow direction a), which means a significant increase in comfort for the operator 11.

Figure 2C:
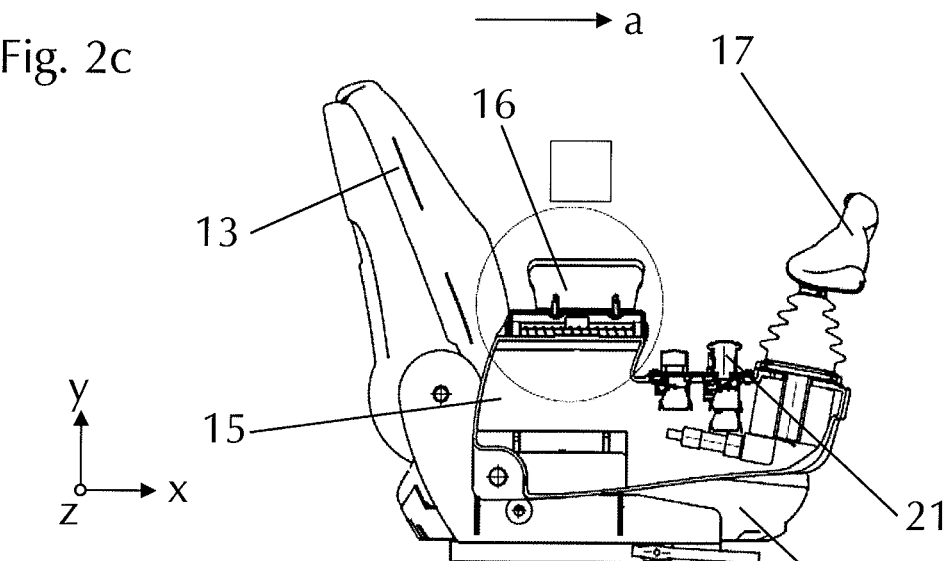
FIG. 2c shows a side view of the machine operator seat from FIGS. 2a and 2b.

Concretely, the arm support 16 is mounted via a guide device 25 on the base part 15 of the armrest 14, whose construction and mode of operation is specified in greater detail in FIGS. 2c to 6b. FIG. 2c shows the machine operator seat 10 from FIG. 2a, a front cover having been removed from the base part 15, to expose the view into the interior of the armrest 14. FIG. 2d shows the area circled in FIG. 2c in a detail enlargement. FIGS. 2a to 2d show the arm support 16 relative to the base part 15 in the middle starting position in relation to its longitudinal displacement range. FIGS. 3a and 3b correspond to FIGS. 2c and 2d, the arm support being located in its position pushed maximally forward. FIGS. 4a and 4b, in contrast, show the armrest 16 in its position pushed maximally to the rear. The arm support 14 is freely displaceable in relation to the base part 15 in the adjustment range delimited by the maximal positions shown in FIGS. 3a/3b and 4a/4b.

One element of the guide device 25 is a sliding carriage 26, which is situated between the base part 15 and the arm support 16. The sliding carriage 26 has a main part 27 lying essentially in the horizontal plane and two tabs or bent-over parts 28 and 29, which are bent over from the main part 27 toward the base part 15 lying underneath. Guide elements are provided between the tabs 28 and 29, which finally allow a linear longitudinal guide of the arm support 16 in relation to the base part 15 together with the sliding carriage 26.

Figure 5A:
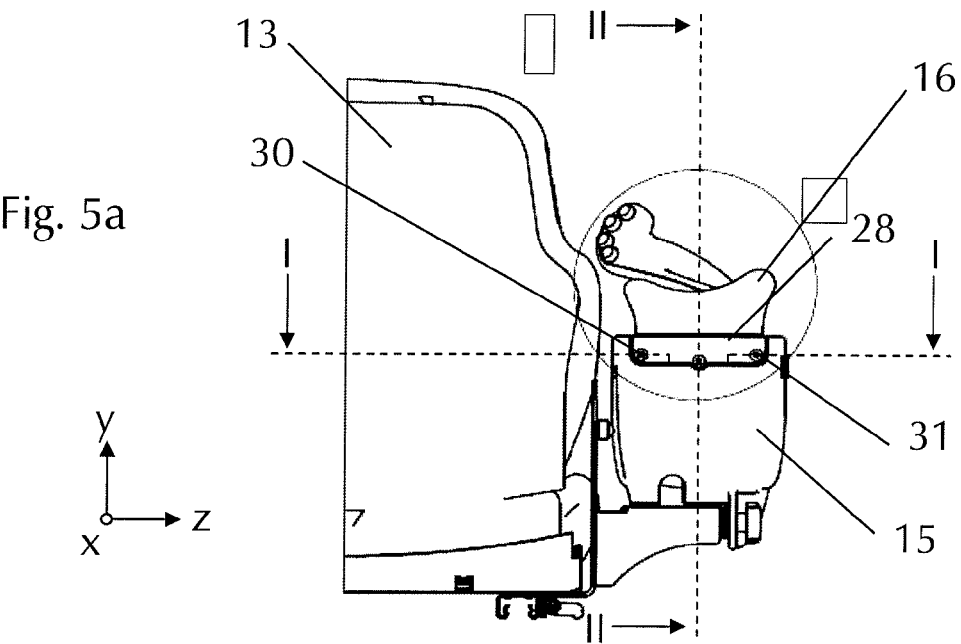
FIG. 5a shows a rear view of the armrest.
Figure 5B:
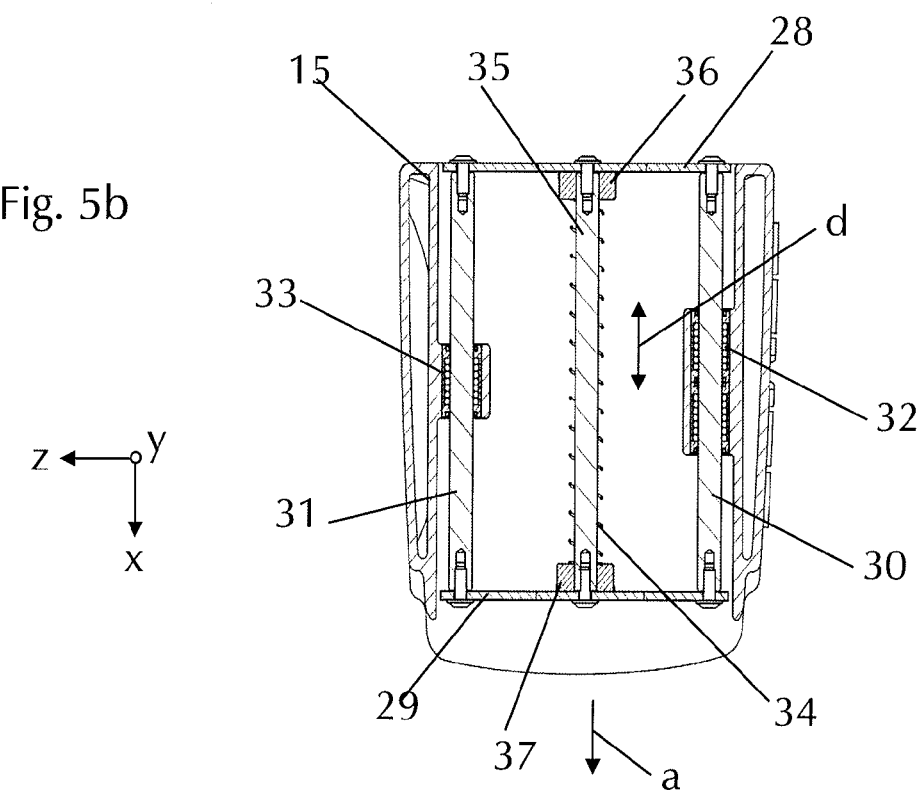
Figure 6A:
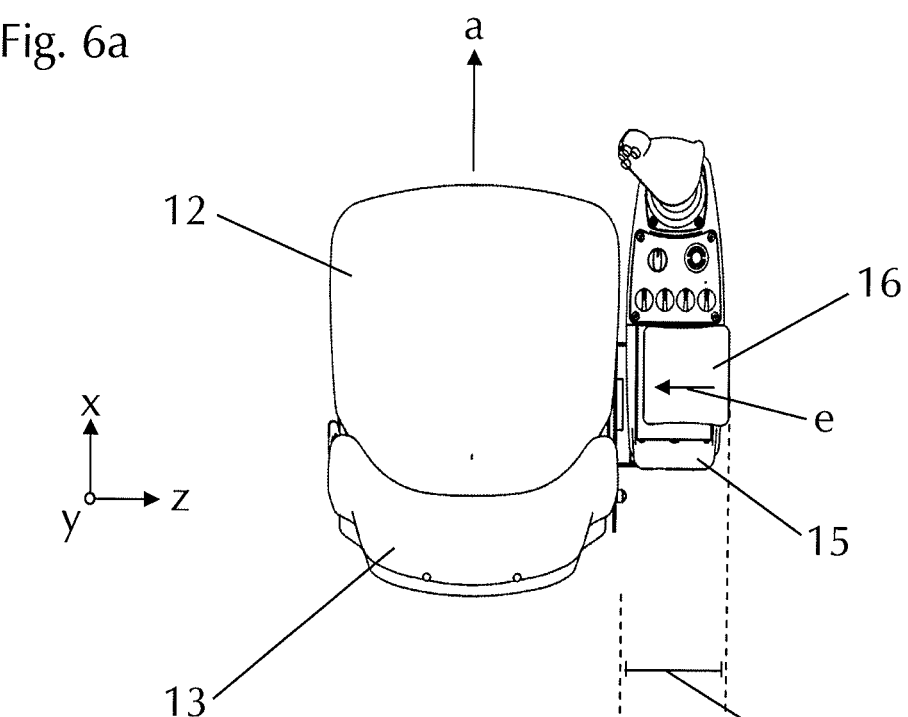
FIG. 6a shows a top view of the machine operator seat according to the preceding figures having laterally placed arm support.
Figure 6B:
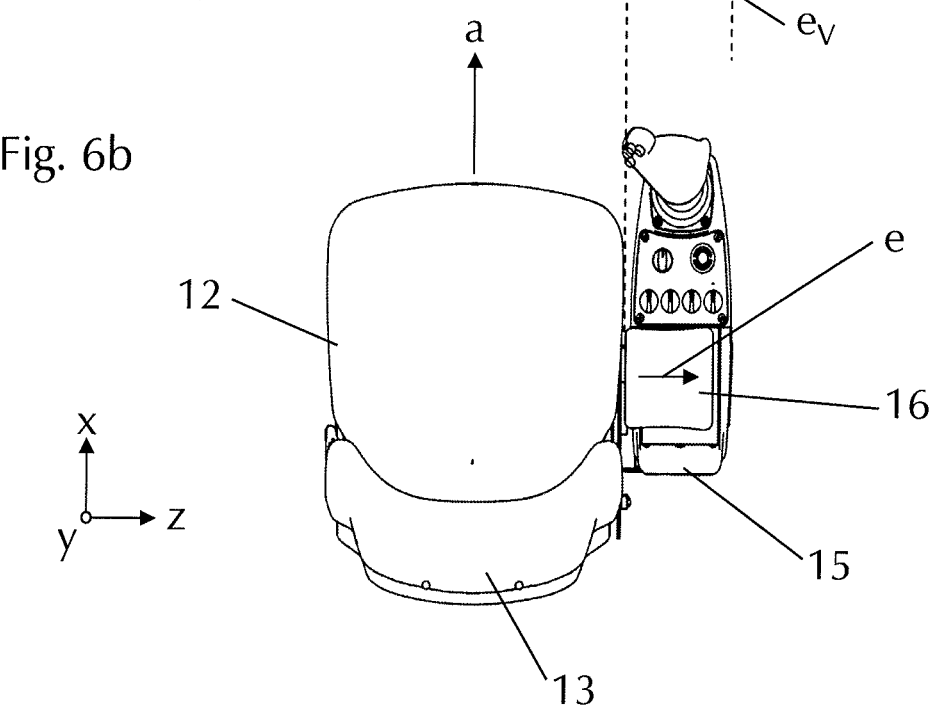
FIG. 6b shows a top view of the machine operator seat from FIG. 6a having arm support displaced toward the seat surface.

For this purpose, reference is first made to FIGS. 5a, 5b, and 5c for further explanation of the construction and the mode of operation of the guide device 25. FIG. 5a shows a detail of the rear view of the machine operator seat 10 from FIG. 2a. FIG. 5b is a sectional view along the dashed line I in FIG. 5a and FIG. 5c is a sectional view along the section line II in FIG. 5a. The viewing directions on the sectional view are each indicated by the corresponding arrows in FIG. 5a. An essential element of the guide device 25 is a linear guide, comprising two guide rails 30 and 31 running in parallel between the tabs 28 and 29. The guide rails 30 and 31 are each round rod elements, which are connected frontally in each case to the tabs 28 and 29 via corresponding screw connections. The guide rails 30 and 31 lie in the horizontal plane and have their longitudinal axes running in the direction of the longitudinal displacement direction d of the arm support 16 relative to the base part 15. Each of the guide rails 30 and 31 of the sliding carriage 26 is mounted via a friction bearing 32, 33 on the base part 15, along which the guide rails 30 and 31, respectively, are guided. Since the arm support 16 is situated on the sliding carriage 26, it is thus longitudinally displaceable together with the sliding carriage 26 along the guide rails 30 and 31 in relation to the base part 15.

The guide device 25 is further implemented in such a way that the sliding carriage 26 is implemented as self-positioning. Therefore, in the unloaded state, the sliding carriage 26 automatically moves into its middle starting position with respect to the overall longitudinal displacement range in relation to the displacement direction d. The capability for self-positioning is concretely achieved in the guide device 25 according to FIGS. 2a to 6b essentially by a restoring compression spring 34, which is situated having its longitudinal axis parallel to the guide rails 30 and 31 between the tabs 28 and 29 of the sliding carriage 26. Along their longitudinal axes, a spring guide rail 35 is guided through the restoring compression spring 34, which is frontally fixed on the tabs 28 and 29.

Figure 2D:
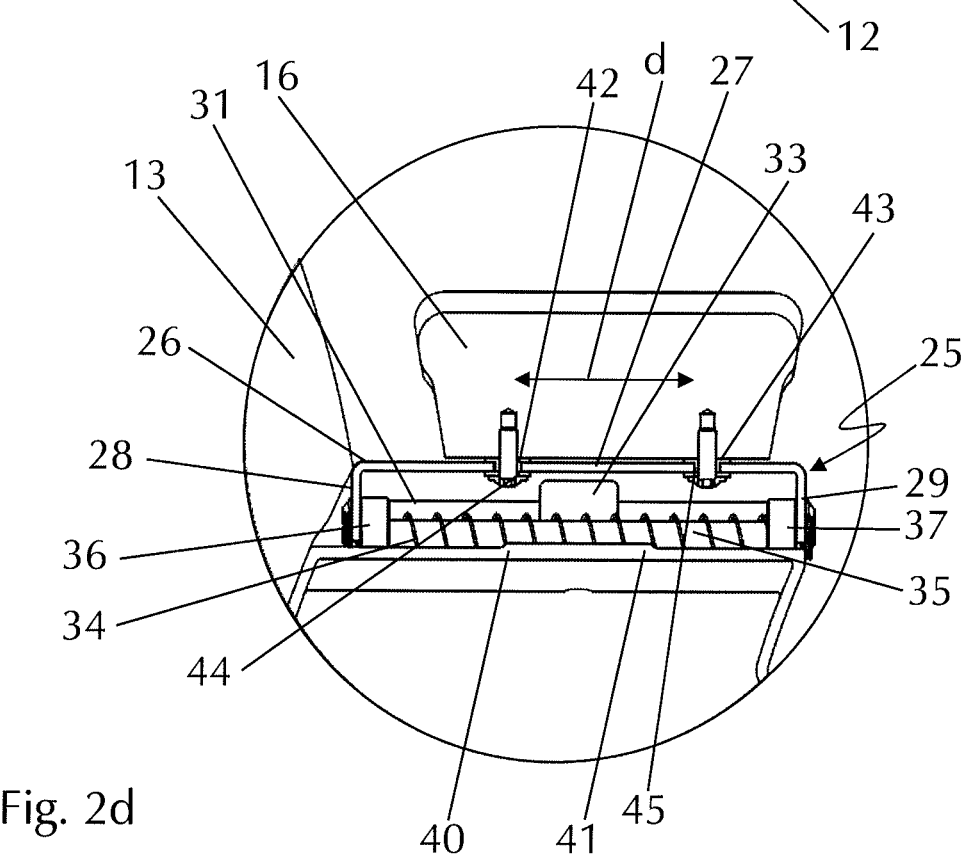
FIG. 2d shows a detail enlargement of the arm support and the guide device in the starting position from FIG. 2c.
Figure 3A:
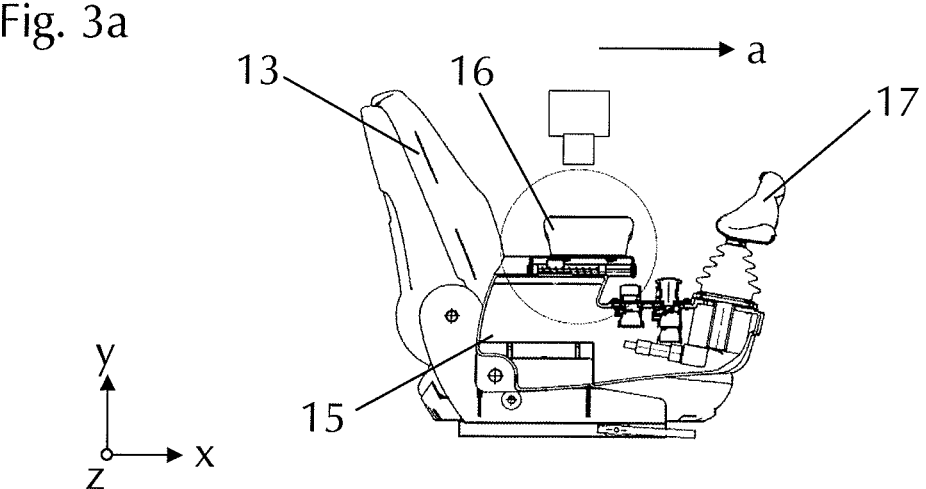
FIG. 3a shows a side view of the machine operator seat from FIGS. 2a to 2d having armrest pushed forward.
Figure 3B:
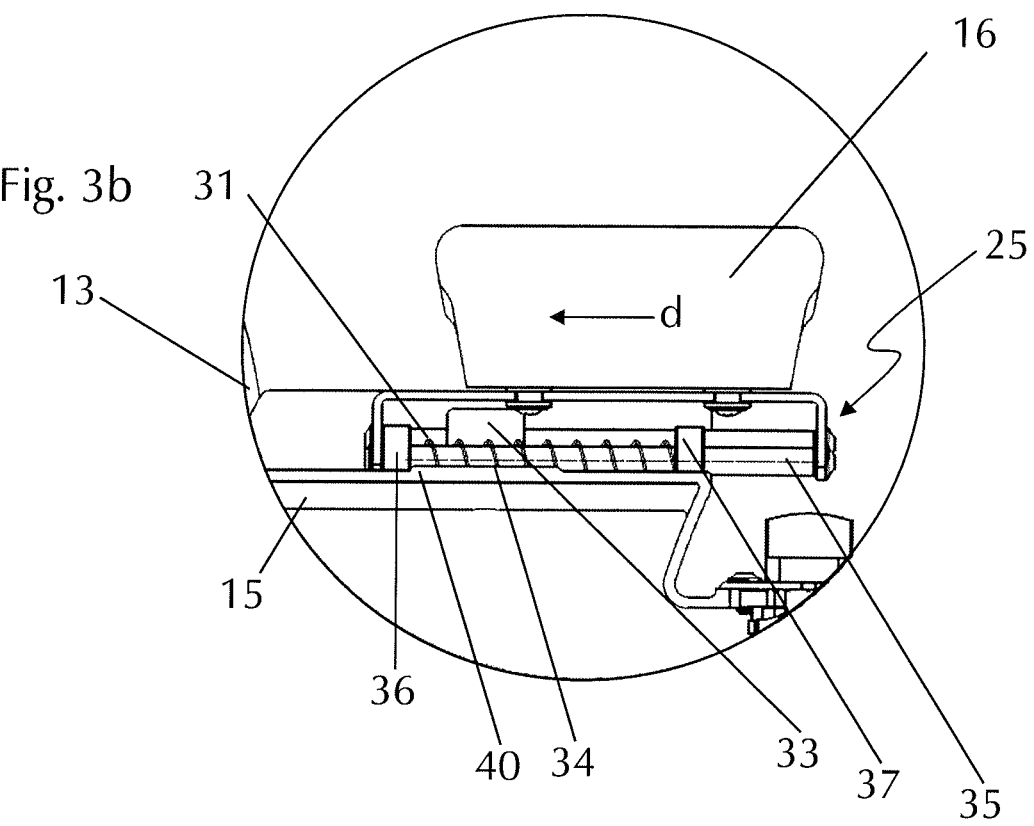
Figure 4A:
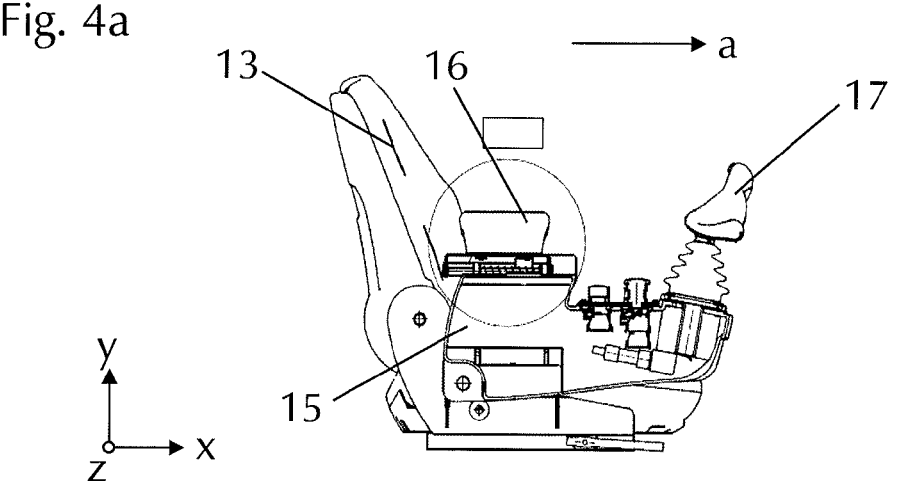
FIG. 4a shows the machine operator seat from FIGS. 2a to 2d having the arm support pushed to the rear.
Figure 4B:
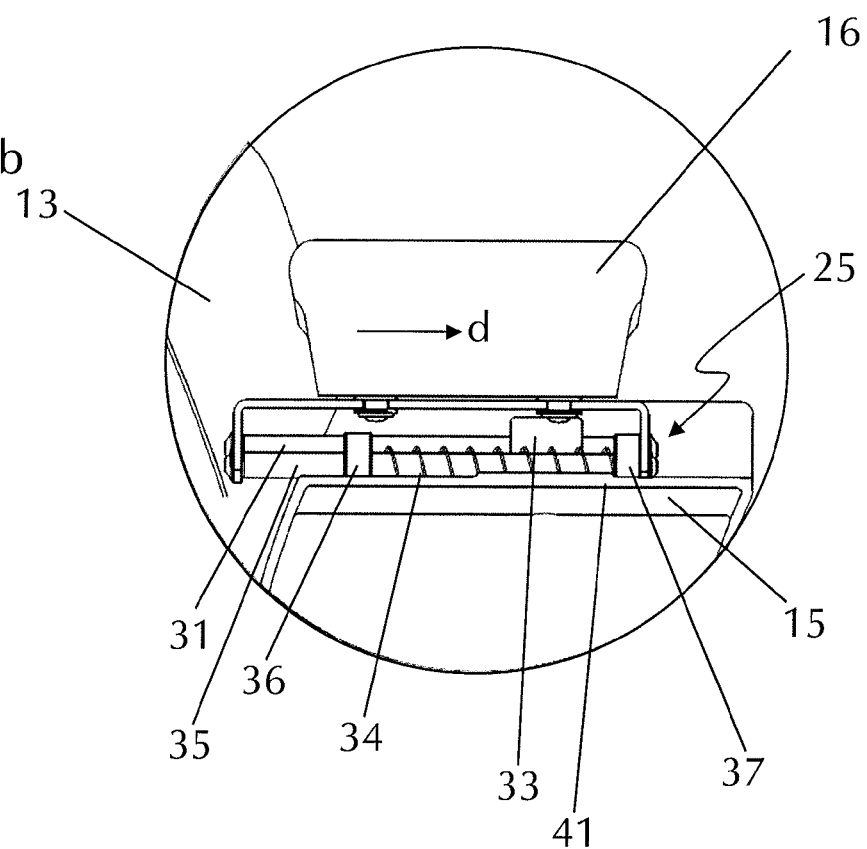

Furthermore, two stop elements 36 and 37 are situated so they are displaceable along the longitudinal axis of the spring guide rail 35 on the spring guide rail 35 between the tabs 28 and 29. The longitudinal axis of the spring guide rail runs parallel to the longitudinal axes of the guide rails 30 and 31 and is situated in the horizontal plane between the two guide rails 30 and 31. The two stop elements 36 and 37 are pressed apart from one another by the restoring compression spring 34 and against the inner sides of the tabs 28 and 29. The stop elements 36 and 37 stop against the stops 38 and 39 situated in the base part 15, whose location is specified in greater detail in FIG. 2d (the stops themselves not being visible in FIG. 2d), in the starting position of the sliding carriage 26, as shown in FIG. 2d, for example. The stops 38 and 39 therefore prevent the stop elements 36 and 37 from being able to be pushed beyond the base part in the longitudinal displacement direction during a movement of the sliding carriage 26. For example, if the arm support 16 is pushed forward or in the viewing direction of the operator 11 together with the sliding carriage 26, the stop element 37 which is in front in the displacement direction is fixed by the stop 39 relative to the base part 15 and does not participate in the displacement movement of the sliding carriage 26. The opposing stop element 36 is carried along by the tab 26, so that overall the distance between the two stop elements 36 and 37 situated opposite to one another on the spring guide rail 35 is shortened and the restoring compression spring 34 situated between the two stop elements 36 and 37 is thus compressed. The restoring compression spring 34 therefore exerts a restoring force on the sliding carriage 26, so that the arm support 16 moves together with the sliding carriage 26 back into the starting position shown in FIG. 2d upon a relief of the arm support 16. In contrast, if the arm support 16 is displaced backward, as shown in FIG. 4b, for example, the restoring compression spring 34 is compressed in that the stop element 36 stops against the stop 38 on the base part 15 and the stop element 37 is moved together with the sliding carriage 26 toward the stop element 36. In the compressed state of the restoring compression spring 34, it exerts a restoring force on the sliding carriage 26 toward the starting position. In the starting position, the restoring compression spring 34 does press both stop elements 36 and 37 apart from one another toward their respective stops 38 and 39 in the base part 15. However, this occurs in equal parts in both directions, so that overall a balanced positioning state is achieved. This configuration therefore overall allows the arm support 16 to be self-positioning to the starting position or to automatically return into the starting position upon a relief.

The longitudinal displaceability of the arm support 16 relative to the base part 15 on the sliding carriage 26 is limited, however. The delimitation is concretely achieved by the projections 40 and 41 in the base part 15, against which the stop elements 36 and 37 stop in the maximally displaced position during a displacement movement of the sliding carriage 26. It is thus ensured that the restoring compression spring 34 is not excessively compressed and thus loses its restoring properties, for example. In addition, the sliding carriage 26 cannot be pushed out of the base part 15. It is therefore also essential for the embodiment shown in the figures that, on the sliding carriage 26, a guide function is achieved by the guide rails 30 and 31 and a self-positioning function is achieved with the aid of the restoring compression spring 34 and the spring guide rail 35.

Furthermore, the arm support 26 is displaceable laterally or in the arrow direction e in relation to the base part 15 to a limited extent. This is shown in greater detail in FIGS. 6a and 6b in particular, FIG. 6a indicating the position placed maximally laterally outward or away from the seat surface 12 and FIG. 6b indicating the position pushed maximally toward the seat surface. The total lateral adjustment range is indicated by $e_v$ in relation to the lateral outer edges of the arm support 16. The middle position is clear from FIG. 1b, for example.

In order to achieve this lateral adjustability, two oblong holes 42 and 43 are situated in the horizontal main part 27 of the sliding carriage 26, whose longitudinal axis in the horizontal plane runs perpendicularly to the longitudinal axis of the guide rails 30 and 31 of the sliding carriage 26. The friction bushes 44 and 45 are guided in the oblong holes 42 and 43, which are each implemented as overlapping with both surfaces of the main part 27. A screw connection is guided through each of the friction bushes 44 and 45, which produces a fixed connection to the bottom side of the arm support 16. In the exemplary embodiment shown, the guide device 25 is implemented in such a way that it is not implemented as self-positioning with respect to the lateral displaceability of the arm support 16. With respect to its lateral position or position displaced in the arrow direction e, the arm support 16 thus maintains its position relative to the base part 15 upon a relief of the arm support.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicant's invention.

What is claimed is:

1. A machine operator seat of a construction machine, comprising:
    a seat surface having a front seat edge;
    a backrest which is situated opposite to the front seat edge in the longitudinal direction of the seat surface; and
    at least one armrest situated laterally to the seat surface, comprising:
        a base part;
        an arm support; and
        at least one operating element, the arm support being situated in a rear area in the longitudinal direction and the at least one operating element being situated in a front area of the armrest in the longitudinal direction,
    wherein the arm support is mounted via a guide device on the base part of the armrest, the guide device comprising:
        a sliding carriage including a support plate having a tab extending toward the base part on each of the opposing sides in the longitudinal dimension of the support plate,
        a spring guide rail, on which a restoring compression spring is situated, extending between the two tabs,
        at least one stop element, which is displaceable along the spring guide rail, situated at one axial end of the restoring compression spring, and
        at least one stop provided on the base part, which is implemented to obtain a restoring function in such a way that it fixes the at least one stop element in relation to the base part in one displacement direction and thus causes a compression of the restoring compression spring during a longitudinal displacement of the support carriage,
    the guide device being implemented in such a way that the arm support is freely displaceable with respect to the base part in a predetermined longitudinal displacement range along the longitudinal direction, and
    further wherein the guide device is implemented to be self-positioning in such a way that the arm support automatically moves into a starting position with respect to its positioning in the longitudinal direction in an unloaded state.

2. The machine operator seat according to claim 1, wherein the guide device comprises a linear guide.

3. The machine operator seat according to claim 1, wherein the guide device has a spring loading for the self-positioning.

4. The machine operator seat according to claim 1, wherein the guide device is implemented in such a way that the arm support is freely displaceable forward and to the rear in a predetermined range in relation to a starting position in the longitudinal direction.

5. The machine operator seat according to claim 1, wherein the guide device is implemented in such a way that the arm support is freely laterally displaceable in a predetermined lateral displacement range.

6. The machine operator seat according to claim 1, wherein the sliding carriage is mounted so as to be displaceable on the base part of the armrest via a friction bearing, and the arm support is situated on the sliding carriage.

7. The machine operator seat according to claim 6, wherein the sliding carriage has a guide rail, which is mounted and guided in the friction bearing.

8. The machine operator seat according to claim 7, wherein the guide rail is situated between the two tabs.

9. The machine operator seat according to claim 1, wherein two stop elements, which are displaceable along the spring guide rail, are situated respectively at each of the two axial ends of the restoring compression spring, and two stops, which are situated spaced apart from one another in the longitudinal direction, are provided on the base part in such a way that the restoring function is caused starting from the starting position of the arm support in one displacement direction by stopping of one of the two stop elements against one of the two stops and in the opposite displacement direction starting from the starting position by stopping of the other of the two stop elements against the other of the two stops.

10. The machine operator seat according to claim 7, wherein the guide rail is implemented in such a way that the guide rail is simultaneously the spring guide rail.

11. The machine operator seat, according to claim 6, wherein the sliding carriage has at least one oblong hole for guiding a lateral adjustment movement of the arm support in relation to the base part.

12. The machine operator seat according to claim 1, wherein the guide device has at least one displacement delimitation in the form of a delimitation projection on the base part.

13. A construction machine, wherein the construction machine has a machine operator seat according to claim 1.

14. A construction machine according to claim 13, wherein the construction machine comprises one of a road miller, recycler, stabilizer, a road roller or a tandem roller.

* * * * *